United States Patent
Lee

(10) Patent No.: US 9,856,978 B2
(45) Date of Patent: Jan. 2, 2018

(54) CONTROL METHOD OF DUAL CLUTCH TRANSMISSION FOR VEHICLE AND CONTROL SYSTEM FOR THE SAME

(71) Applicant: Hyundai Motor Company, Seoul (KR)

(72) Inventor: Ho Young Lee, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 129 days.

(21) Appl. No.: 15/137,525

(22) Filed: Apr. 25, 2016

(65) Prior Publication Data
US 2017/0122433 A1 May 4, 2017

(30) Foreign Application Priority Data
Oct. 30, 2015 (KR) .......................... 10-2015-0151872

(51) Int. Cl.
| | |
|---|---|
| *F16D 48/06* | (2006.01) |
| *F16H 61/688* | (2006.01) |
| *F16H 3/00* | (2006.01) |
| *F16H 59/68* | (2006.01) |
| *F16H 59/38* | (2006.01) |

(Continued)

(52) U.S. Cl.
CPC ............ *F16H 61/688* (2013.01); *F16D 48/06* (2013.01); *F16H 3/006* (2013.01); *B60W 10/02* (2013.01); *B60W 10/113* (2013.01); *B60W 30/186* (2013.01); *B60W 2510/0225* (2013.01); *F16H 59/38* (2013.01); *F16H 2059/6807* (2013.01); *Y10T 477/6414* (2015.01)

(58) Field of Classification Search
CPC . Y10T 477/6414; F16D 48/06; F16H 61/688; F16H 3/006; F16H 59/38; F16H 2059/6807; B60W 10/02; B60W 10/113; B60W 30/186; B60W 2510/0225
USPC ........................................................... 701/68
See application file for complete search history.

(56) References Cited

U.S. PATENT DOCUMENTS

| | | | |
|---|---|---|---|
| 8,725,372 B2 * | 5/2014 | Rinck | F16D 48/06 192/3.55 |
| 2010/0114443 A1 | 5/2010 | Terwart et al. | |

(Continued)

FOREIGN PATENT DOCUMENTS

| | | |
|---|---|---|
| JP | 2006-226316 | 8/2006 |
| JP | 2006-234164 A | 9/2006 |

(Continued)

OTHER PUBLICATIONS

English Translation of KR20140121947A, www.translationportal.epo.org , Sep. 27, 2017 (Year: 2017).*

(Continued)

*Primary Examiner* — Roger L Pang
(74) *Attorney, Agent, or Firm* — Brinks Gilson & Lione

(57) ABSTRACT

The present disclosure provides a control method and a control system of a dual clutch transmission for a vehicle. The method includes: a pre-engagement-determining step of determining whether any one of gears has been pre-engaged, by means of a controller; a clutch-moving step of generating an oscillation signal to the release input shaft and increasing a clutch position value of the release input shaft; and a signal-determining step of determining whether the oscillation signal generated to the release input shaft is sensed at the engagement input shaft.

6 Claims, 2 Drawing Sheets

Figure 1:
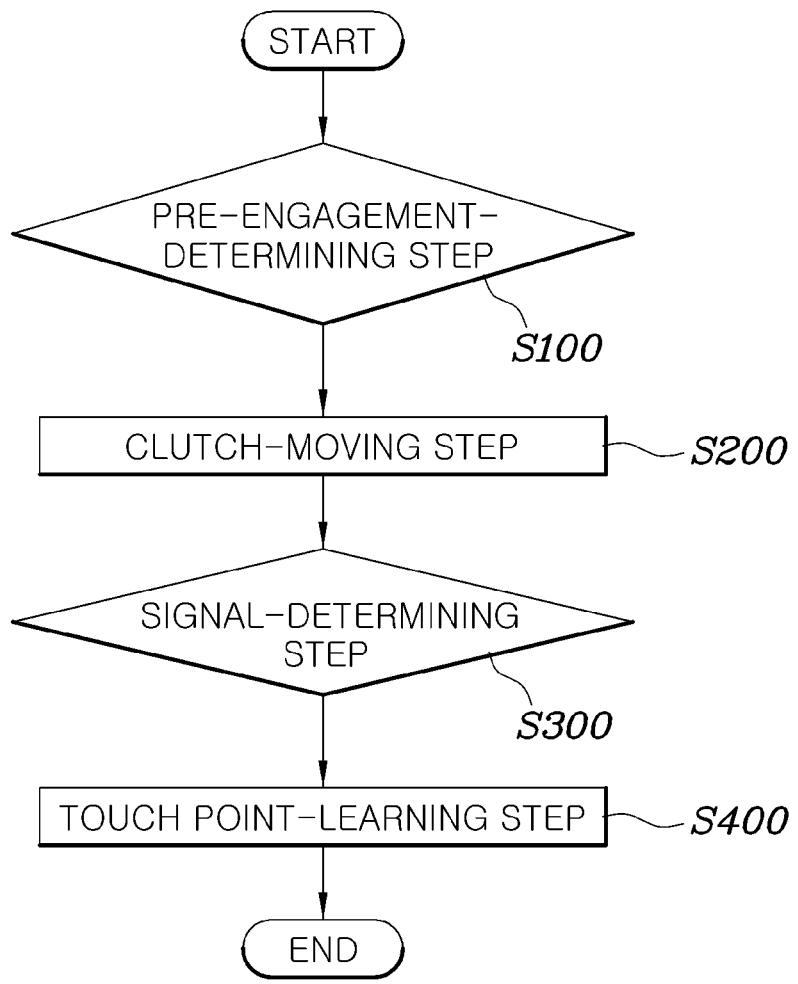

(51) Int. Cl.
    *B60W 10/02*       (2006.01)
    *B60W 30/186*    (2012.01)
    *B60W 10/113*    (2012.01)

(56) References Cited

U.S. PATENT DOCUMENTS

2014/0136065 A1*   5/2014   Yoon ........................ F16D 48/06
                                                                                                      701/68
2017/0138421 A1*   5/2017   Cho ......................... F16D 48/08

FOREIGN PATENT DOCUMENTS

| JP | 2011161982 A | * | 8/2011 | ............. | F16H 3/006 |
| JP | 2011-202749 | | 10/2011 | | |
| JP | 2013-035403 A | | 2/2013 | | |
| KR | 10-2014-0075387 | | 6/2014 | | |
| KR | 10-2014-0121947 A | | 10/2014 | | |

OTHER PUBLICATIONS

English Translation of JP2011161982A, www.translationportal.epo.org, Sep. 27, 2017 (Year: 2017).*

* cited by examiner

CONTROL METHOD OF DUAL CLUTCH TRANSMISSION FOR VEHICLE AND CONTROL SYSTEM FOR THE SAME

CROSS REFERENCE TO RELATED APPLICATION

The present application claims priority to and the benefit of Korean Patent Application No. 10-2015-0151872, filed Oct. 30, 2015, which is incorporated herein by reference in its entirety.

FIELD

The present disclosure relates to a control method of a dual clutch transmission for learning touch points of a dual clutch transmission while a vehicle is driven, and a control system for the same.

BACKGROUND

The statements in this section merely provide background information related to the present disclosure and may not constitute prior art.

A dual clutch transmission, which is a system for automatically controlling a manual transmission, transmits engine torque using a dry clutch, unlike a common automatic transmission (A/T) that uses a torque converter and a wet multi-plate clutch.

In particular, torque that is transmitted by a dry clutch is largely changed by various factors such as differences of the parts, the degree of friction related to the period of use, thermal deformation due to high temperature, and a change in friction coefficient of a disc, so we have discovered that it is difficult to estimate the torque transmitted to the clutch while a vehicle is driven.

As described above, when a change in clutch torque due to these various factors is not accurately determined, the clutch may excessively slip or shock is generated, so we have discovered that it is desired to estimate and correct the torque characteristic of the dry clutch in real time.

In particular, a touch point, which means a clutch position where torque starts to be transmitted from a driving shaft of an engine to the input shaft of a transmission acts as an important factor in clutch control and may be changed by temperature or centrifugal force even while a vehicle is driven, thus it is desired to check the touch point.

The foregoing is intended merely to aid in the understanding of the background of the present disclosure, and is not intended to mean that the present disclosure falls within the purview of the related art that is already known to those skilled in the art.

SUMMARY

The present disclosure provides a control method and system of a dual clutch transmission for a vehicle that effectively improves drivability and shifting quality by improving accuracy of clutch torque by learning a touch point of the transmission even while the vehicle is driven.

The present disclosure provides a control method of a dual clutch transmission for a vehicle that includes: a pre-engagement-determining step of determining whether any one of gears on a release input shaft has been pre-engaged, by means of a controller; a clutch-moving step of generating an oscillation signal to the release input shaft and increasing a clutch position value by controlling a clutch actuator of the release input shaft, when the controller determines that any one of the gears on the release input shaft has been pre-engaged in the pre-engagement-determining step; a signal-determining step of determining whether the oscillation signal generated to the release input shaft has been sensed at an engagement input shaft by means of the controller; and a touch point-learning step of learning a current clutch point of the release input shaft as a touch point, when the controller determines that the oscillation signal has been sensed at the engagement input shaft in the signal-determining step.

In the clutch-moving step, the controller may generate an oscillation signal having a frequency set in advance in the controller by periodically changing a clutch torque value of the release input shaft by controlling the clutch actuator of the release input shaft.

In the signal-determining step, the controller may determine whether the oscillation signal generated to the release input shaft is sensed at the engagement input shaft by monitoring a rotational speed of the engagement input shaft.

In the signal-determining step, the controller may determine whether the oscillation signal generated to the release input shaft is sensed at the engagement input shaft by filtering a signal generated to the engagement input shaft and monitoring the filtered signal.

In the signal-determining step, the signal generated to the engagement input shaft is filtered by a high-pass filter and the oscillation signal generated in an oscillation signal-generating step may have a frequency within a pass band of the high-pass filter.

According to another aspect of the present disclosure, there is provided a control system of a dual clutch transmission for a vehicle, which includes: a transmission including an engagement input shaft and a release input shaft connected to clutches, respectively; a clutch actuator adjusting clutch positions of the input shafts; and a controller determining whether any one of gears on the release input shaft has been pre-engaged, adjusting a clutch position and a clutch torque by controlling the clutch actuator, determining whether an oscillation signal, which is generated to the release input shaft, is sensed at the engagement input shaft, and learning the clutch position of the release input shaft as a touch point when the oscillation signal for the release input shaft is sensed at the engagement input shaft.

According to the control method and control system of a dual clutch transmission for a vehicle, it is possible to effectively improve drivability and shifting quality by improving accuracy of clutch torque by learning a touch point of the dual clutch transmission even while a vehicle is driven.

In particular, by generating an oscillation signal to the release input shaft on which any one of gears has been pre-engaged and controlling a clutch position, by determining whether the oscillation signal is sensed at the engagement input shaft, and learning the touch point of the release input shaft, it is possible to learn the touch point of the release input shaft even though any one of the gears on the release input shaft has been pre-engaged.

Further, by monitoring the signal generated to the engagement input shaft using a signal filter, it is possible to discriminate and sense an oscillation signal from oscillation due to external disturbance such as contact on the ground, so it is possible to more accurately learn a touch point.

Further areas of applicability will become apparent from the description provided herein. It should be understood that the description and specific examples are intended for purposes of illustration only and are not intended to limit the scope of the present disclosure.

DRAWINGS

Figure 2:
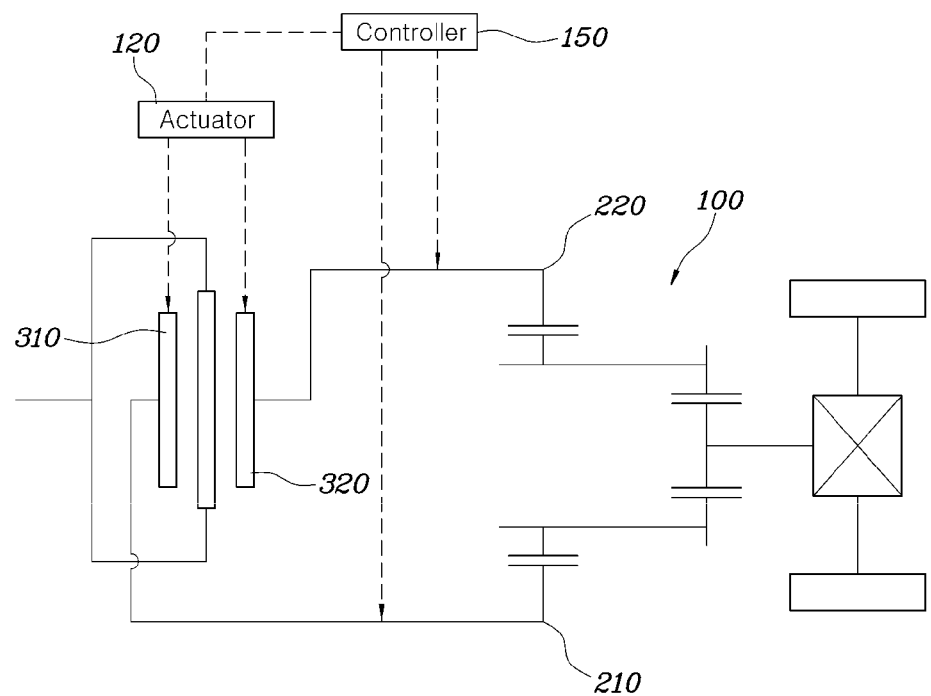

In order that the disclosure may be well understood, there will now be described various forms thereof, given by way of example, reference being made to the accompanying drawings, in which:

FIG. 1 is a flowchart illustrating a control method of a dual clutch transmission for a vehicle; and FIG. 2 is a diagram showing a control system of a dual clutch transmission for a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A control method of a dual clutch transmission for a vehicle according to the present disclosure, as shown in FIGS. 1 and 2, includes: a pre-engagement-determining step of determining whether any one of gears on a release input shaft 220 has been pre-engaged by means of a controller 150 (S100); a clutch-moving step of generating an oscillation signal to the release input shaft 220 and increasing a clutch position value by controlling a clutch actuator 120 of the release input shaft 220 (S200), when the controller 150 determines that any one of gears on the release input shaft 220 has been pre-engaged in the pre-engagement-determining step (S100); a signal-determining step of determining whether the oscillation signal generated to the release input shaft 220 has been sensed at an engagement input shaft 210 by means of the controller 150 (S300); and a touch point-learning step of learning the current clutch point of the release input shaft 220 as a touch point (S400), when the controller 150 determines that the oscillation signal has been sensed at the engagement input shaft 210 in the signal-determining step (S300).

In detail, the pre-engagement determining step (S100) determines whether any one of gears on the release input shaft 220 has been pre-engaged by means of the controller 150.

A dual clutch transmission stated herein is a system for automatically controlling a manual transmission, and transmits engine torque, using dry clutches, unlike a common A/T that uses a torque converter and a wet multi-plate clutch.

A dual clutch transmission includes two input shafts (e.g., a release input shaft and an engagement input shaft). The release input shaft is disengaged from the driving shaft of an engine so that the release input shaft does not transfer power of the engine. Pre-engagement stated herein means that any one of gears on the release input shaft 220 is engaged with the release input shaft 220 regardless of the gear in the current power transmission line.

When clutch torque is transmitted to the release input shaft 220 with a pre-engaged gear, a gear ratio of engaged gear on the engagement input shaft 210 is different from a gear ratio of the pre-engaged gear on the release input shaft 220 so that interlock may occur and shock is applied to the transmission, which may break the transmission.

The present disclosure may, even under the situation described above, accurately find out the touch point of a clutch 320 on the release input shaft 220 on which a gear is pre-engaged, and for this purpose, the controller 150 determines that any one of the gears on the release input shaft 220 has been pre-engaged in the pre-engagement-determining step (S100).

In this form, the touch point means a clutch position when power starts to be transmitted to the clutches 310 and 320, and the clutch position means the movement amount of the clutches 310 and 320 according to the position or the stroke amount of a clutch actuator 120, in which the clutch torque is controlled by adjusting the clutch position.

In the clutch-moving step (S200), when the controller 150 determines that any one of the gears on the release input shaft 220 has been pre-engaged in the pre-engagement-determining step (S100), an oscillation signal is generated to the release input shaft 220 and the clutch position value is increased by controlling the clutch actuator 120 of the release input shaft 220.

The clutch position value is increased also by an increase in stroke amount of the clutch actuator 120, so the movement amount of the clutches 310 and 320 is increased and they are engaged with the driving shaft of the engine, or pressing is increased with the clutches engaged and clutch torque is increased accordingly.

As described above, in the clutch-moving step (S200), the controller 150 controls the clutch actuator 120 such that the clutch position of the release input shaft 220 and the touch point is reached, and generates an oscillation signal having a specific frequency to the release input shaft 220.

The frequency of the oscillation signal may be determined at various levels in accordance with the condition of the vehicle and the oscillation signal may be generated in various ways, but in one form of the present disclosure, as described below, the clutch actuator 120 is controlled such that an oscillation signal is generated to the stroke amount by controlling the clutch actuator 120 of the release input shaft 220.

When a touch point of the release input shaft 220 on which any one of gears have been pre-engaged is determined on the basis of the oscillation signal, a signal that may be easily discriminated from noise signals due to vibration from the ground or other factors is used, so it is advantageous for accurately determining the touch point.

On the other hand, in the signal-determining step (S300), the controller 150 determines whether the oscillation signal generated by the release input shaft 220 is sensed at the engagement input shaft 210.

As described above, the oscillation signal generated by controlling the clutch actuator 120 influences the clutch position and cannot be transmitted to the release input shaft 220 and the engagement input shaft 210 that can transmit only torque, but even if it is transmitted, it is weak and is difficult to sense at the engagement input shaft 210.

When the clutch position value has the oscillation signal and gradually increases and reaches the touch point by controlling the stroke amount of the clutch actuator 120, an oscillation signal is shown in the clutch torque due to influence by the stroke amount of the actuator 120 or the oscillation signal of the clutch position.

When an oscillation signal is shown in the clutch torque, an oscillation signal is shown in the rotational speed of the release input shaft 220 as well, so in the present disclosure, when the clutch position of the release input shaft 220 reaches the touch position, an oscillation signal is generated in the rotational speed of the release input shaft 220.

According to the structure of the dual clutch transmission of the present disclosure in which input shafts are always engaged to rotate with an output shaft, the oscillation signal of the release input shaft 220 cannot influence rotation of the release input shaft 220 before the clutch position reaches the touch point, so it cannot sensed at the engagement input shaft 210; however, when the clutch position of the release input shaft 220 reaches the touch point, an oscillation signal is generated in the rotational speed of the release input shaft 220, so an oscillation signal is generated also in the rotational speed of the engagement input shaft 210 due to the continuous engagement.

As a result, it is possible to accurately determine an oscillation signal by sensing whether an oscillation signal is generated in the rotational speed of the engagement input shaft 210 of which a clutch is engaged and thus the influence of external disturbances is relatively small. The release input shaft 220 is not desired because it is difficult to sense a signal due to a relatively large influence by vibration caused by external disturbances such as contact on the ground because a clutch is not engaged, but.

In the touch point-learning step (S400), when the controller 150 determines that an oscillation signal has been sensed at the engagement input shaft 210, the controller learns the current clutch position of the release input shaft 220 as a touch point.

In the present disclosure, torque that is transmitted by a dry clutch is largely changed by various factors such as differences of the parts, the degree of friction relating to the period of use, thermal deformation due to high temperature, and a change in friction coefficient of a disc, so it is difficult to estimate the torque transmitted to the clutch while a vehicle is driven.

Accordingly, when a change in clutch torque during clutch control is not accurately determined, the clutch may excessively slip or shock is generated, so it is desired to estimate and correct the torque characteristic of the dry clutch in real time.

In particular, the touch point that means the position values of the clutches 310 and 320 or the stroke amount of the actuator when torque starts to be transmitted from the driving shaft of the engine to the input shafts of the transmission acts as an important factor in clutch control.

As described above, when the clutch position of the release input shaft 220 corresponds to the touch point, an oscillation signal is generated also in the rotational speed of the engagement input shaft 210, so when an oscillation signal is shown at the engagement input shaft 210, the controller 150 learns the current clutch position of the release input shaft 220 as a touch point.

That is, an oscillation signal having a specific frequency is used and it is sensed at the engagement input shaft 210, so it is possible to learn the touch point of the release input shaft 220 on which a gear has been pre-engaged even without directly engaging the clutch 320 of the release input shaft 220 and it is also possible to accurately sense an oscillation signal from external disturbances from the ground.

On the other hand, as shown in FIGS. 1 and 2, in the control method of a dual clutch transmission for a vehicle according to the present disclosure, in the clutch-moving step (S200), the controller 150 generates an oscillation signal having a frequency set in advance in the controller 150 by periodically changing the clutch torque value of the release input shaft 220 by controlling the clutch actuator 120 of the release input shaft 220.

As described above, in an form of the present disclosure, an oscillation signal is generated in the stroke amount of the release input shaft 220 by controlling the clutch actuator 120, so when the clutch position of the release input shaft 220 reaches a touch point, an oscillation signal is generated in to the clutch torque.

As an oscillation signal is generated on the release input shaft 220, it is possible to generate an oscillation signal that can be sensed at the engagement input shaft 210 only when the clutch position of the release input shaft 220 reaches a touch point even without a specific signal generator.

However, when generating an oscillation signal, control of the stroke amount of the clutch actuator 120 does not need to have a change range that is large enough to remarkably change the clutch position, so it is advantageous in the present disclosure to control the stroke amount at a fine oscillation level.

Accordingly, the clutch position of the release input shaft 220 can ignore a fine change due to an oscillation signal and can be controlled to gradually increase to the touch point.

As shown in FIGS. 1 and 2, in the control method of a dual clutch transmission for a vehicle, in the signal-determining step (S300), the controller 150 determines whether an oscillation signal generated to the release input shaft 220 is sensed at the engagement input shaft 210 by monitoring the rotational speed of the engagement input shaft 210.

The oscillation signal at the engagement input shaft 210 can be generated in various ways, but, as described above, by sensing the oscillation signal generated in the rotational speed of the engagement input shaft 210, it is possible to detect an error in sensing the touch point due to external disturbances and to sense an oscillation signal that is generated only when the clutch position of the release input shaft 220 reaches the touch point.

As shown in FIGS. 1 and 2, in the control method of a dual clutch transmission for a vehicle, in the signal-determining step (S300), a signal generated to the engagement input shaft 210 is filtered and the controller 150 determines whether an oscillation signal generated to the engagement input shaft 220 is sensed at the release input shaft 220 by monitoring the filtered signal.

The method senses the oscillation signal, which is generated to the release input shaft 220, at the engagement input shaft 210, that is, the oscillation signal for the rotational speed in order to reduce the influence by external disturbances, but even in this case, external disturbances are caused by various reasons and may interfere with sensing of the oscillation signal.

Accordingly, by filtering noise in consideration of an oscillation signal and sensing an oscillation signal from the filtered signal, it is possible to improve accuracy in determination of the touch point of the release input shaft 220 with any one gear pre-engaged.

Further, as shown in FIGS. 1 and 2, in the control method of a dual clutch transmission for a vehicle, in the signal-determining step (S300), the signal generated to the engagement input shaft 210 is filtered by a high-pass filter and the oscillation signal generated in an oscillation signal-generating step has a frequency within the pass band of the high-pass filter.

Noise signals that may be generated by influence from the ground and other various reasons may be temporary or may have low-band frequencies in most cases. Accordingly, the controller 150 generates an oscillation signal by controlling the clutch actuator 120, generates predetermined high-band frequencies, and uses a high-band filter for removing noise signals, thereby improving accuracy in sensing the oscillation signal at the engagement input shaft 210.

On the other hand, as in FIG. 2, a control system 100 of a dual clutch transmission for a vehicle includes: a transmission including an engagement input shaft 210 and a release input shaft 220 connected to clutches 310 and 320, respectively; a clutch actuator 120 adjusting clutch positions of the input shafts; and a controller 150 determining whether any one of gears on the release input shaft 220 has been pre-engaged, adjusting a clutch position and clutch torque by controlling the clutch actuator 120, determining whether an oscillation signal, which is generated to the release input shaft 220, is sensed at the engagement input shaft 210, and learning the clutch position of the release input shaft 220 as a touch point when the oscillation signal for the release input shaft 220 is sensed at the engagement input shaft 210.

In detail, in the transmission, the clutches 310 and 320 are engaged with a driving shaft of an engine, power is transmitted through the engagement input shaft 210, power is not transmitted through the release input shaft 220, and the clutch actuator 120 is provided for adjusting the clutch positions of the input shafts.

The controller 150 determines whether any one of gears on the release input shaft 220 has been pre-engaged with a rotary shaft, and adjusts the clutch position of the release input shaft 220 or generates an oscillation signal by adjusting the stroke amount of the clutch actuator 120.

Further, the controller 150 senses whether an oscillation signal is generated to the engagement input shaft 210 by monitoring the rotational speed of the engagement input shaft 210 etc., and learns and keeps the clutch position of the release input shaft 220 as a touch point when the oscillation signal is sensed at the engagement input shaft 210.

As the controller 150 learns a touch point, the touch point that may be continuously changed while a vehicle is driven can be accurately learned, so drivability and shifting quality of the vehicle can be improved.

Although the present disclosure was described with reference to specific forms shown in the drawings, it is apparent to those skilled in the art that the present disclosure may be changed and modified in various ways without departing from the scope of the present disclosure.

What is claimed is:

1. A control method of a dual clutch transmission for a vehicle, the method comprising:
   a pre-engagement-determining step of determining whether any one of gears on a release input shaft has been pre-engaged, by means of a controller;
   a clutch-moving step of generating an oscillation signal to the release input shaft and increasing a clutch position value by controlling a clutch actuator of the release input shaft, when the controller determines that any one of the gears on the release input shaft has been pre-engaged in the pre-engagement-determining step;
   a signal-determining step of determining whether the oscillation signal generated to the release input shaft has been sensed at an engagement input shaft by means of the controller; and
   a touch point-learning step of learning a current clutch point of the release input shaft as a touch point, when the controller determines that the oscillation signal has been sensed at the engagement input shaft in the signal-determining step.

2. The method of claim 1, wherein in the clutch-moving step, the controller is configured to generate an oscillation signal having a frequency set in advance in the controller by periodically changing a clutch torque value of the release input shaft by controlling the clutch actuator of the release input shaft.

3. The method of claim 1, wherein in the signal-determining step, the controller is configured to determine whether the oscillation signal generated to the release input shaft is sensed at the engagement input shaft by monitoring a rotational speed of the engagement input shaft.

4. The method of claim 1, wherein in the signal-determining step, the controller is configured to determine whether the oscillation signal generated to the release input shaft is sensed at the engagement input shaft by filtering a signal generated to the engagement input shaft and monitoring the filtered signal.

5. The method of claim 4, wherein in the signal-determining step, the signal generated to the engagement input shaft is filtered by a high-pass filter and the oscillation signal generated in an oscillation signal-generating step has a frequency within a pass band of the high-pass filter.

6. A control system of a dual clutch transmission for a vehicle, comprising:
   a transmission including an engagement input shaft and a release input shaft connected to clutches, respectively;
   a clutch actuator configured to adjust clutch positions of the engagement and release input shafts; and
   a controller configured to determine whether any one of gears on the release input shaft has been pre-engaged, and configured to adjust a clutch position and a clutch torque by controlling the clutch actuator, and
   wherein the controller is configured to determine whether an oscillation signal, which is generated to the release input shaft, is sensed at the engagement input shaft, and configured to learn the clutch position of the release input shaft as a touch point when the oscillation signal for the release input shaft is sensed at the engagement input shaft.

* * * * *